United States Patent [19]

Johnson et al.

[11] 3,958,741

[45] May 25, 1976

[54] METHOD OF MOUNTING SILICON ANODES IN A CHLOR-ALKALI CELL

[75] Inventors: Harlan B. Johnson, Rittman; Cletus N. Welch, Clinton; Aleksandrs Martinsons, Wadsworth, all of Ohio

[73] Assignee: PPG Industries, Inc., Pittsburgh, Pa.

[22] Filed: Mar. 4, 1974

[21] Appl. No.: 447,708

[52] U.S. Cl. ................................. 228/122
[51] Int. Cl.² ............................. B23K 31/02
[58] Field of Search ............... 29/473.1, 492, 472.7, 29/472.9, 204, 503, 504, 500; 161/DIG. 1; 204/242, 286, 291, 280, 196; 228/122

[56] References Cited
UNITED STATES PATENTS

| | | | |
|---|---|---|---|
| 2,793,420 | 5/1957 | Johnston | 29/492 |
| 3,147,414 | 9/1964 | Pelfrey | 29/492 |
| 3,376,209 | 4/1968 | Sabins | 204/291 |
| 3,445,212 | 5/1969 | Bishop | 29/473.1 |
| 3,651,562 | 5/1972 | Hambleton | 29/473.1 |
| 3,743,592 | 7/1973 | Metcalff | 204/286 |

Primary Examiner—Al Lawrence Smith
Assistant Examiner—Robert C. Watson
Attorney, Agent, or Firm—Richard M. Goldman

[57] ABSTRACT

Disclosed is a method of mounting a silicon member intended for use as an anode in the lead base of a chlor-alkali electrolytic cell. According to this invention, the amount of molten lead provided on the cell base in contact with the stem or base of the anode is low enough to avoid subjecting the silicon member to excessive thermal stresses.

9 Claims, No Drawings

METHOD OF MOUNTING SILICON ANODES IN A CHLOR-ALKALI CELL

BACKGROUND

Chlorine is electrolytically prepared from sodium chloride in electrolytic cells of the diaphragm type. In diaphragm chlor-alkali electrolytic cells, brine is fed to the cell chamber. Within the anolyte chamber of the cell, an anolyte cell liquor containing sodium ion and chloride ions is present. The chloride ions react at the anode according to the following reaction:

$$Cl^- \rightarrow Cl + e^-$$

to provide nascent chlorine which then reacts:

$$2Cl \rightarrow Cl_2$$

to provide molecular chlorine.

The sodium ion passes through a permeable barrier to the catholyte chamber. In one type of cell, the permeable barrier is permeable to both sodium ion and to electrolyte. Such a permeable barrier is called a diaphragm. Diaphragms may be prepared from fibrous materials such as asbestos. They may, additionally, be treated to render them more durable, for example, by controlled heating, impregnation with various silicates, and treatment with various fluorocarbon compounds.

Alternatively, the barrier may be permeable only to cations and substantially impermeable to the bulk flow of electrolyte. Such a cation permeable barrier is referred to as the permionic membrane. Permionic membranes may be provided by various organic fibers and membranes, such as perfluoroalkyl resins having acid moieties. An effective permionic membrane is provided by an interpolymer of tetrafluoroethylene and trifluorovinyl sulfonic acid homologs, such as DuPont "XR" resin.

The catholyte liquor contains sodium ions, hydroxyl ions, and in the case of liquid permeable diaphragms, chloride ion.

In the monopolar electrolytic cells of the prior art, as well as in bipolar electrolytic cells of the prior art described, for example, in U.S. Pat. No. 3,337,443 to C. W. Raetzsch et al and in U.S. Pat. No. 3,563,878 to M. P. Grotheer, the anodes are graphite anodes.

In more recent chlor-alkali cell designs, the anodes have been provided by a valve metal, typically titanium, haing an electroconductive, electrocatalytic surface. Such titanium anodes, however, require significantly different cell bottoms and cell bottom geometry than is normally present in chlor-alkali cells intended for the use with graphite electrodes. For this reason, substantial redesign of the cell bottom and, in many instances, new cell bottoms are required to convert existing graphite anodeequipped diaphragm cells to titanium anodes.

A more recent development in chlor-alkali cell technology has been silicon anodes. Typically, the silicon useful in providing an anode for chlor-alkali service has an electrical conductivity greater than 100 (ohm-centimeters)$^{-1}$ and substantial chemical resistance to acidic anolyte liquors under anodic conditions. The silicon alloys having the high electrical conductivity and the corrosion resistance required for electrochemical applications are characterized by the presence of a dopant and the presence of a transition metal. Typically, the dopant is present in an amount sufficient to provide an electrical conductivity in excess of 100 (ohm-centimeters)$^{-1}$.

The silicon anodes useful in chlor-alkali electrolysis have a suitable electroconductive, electrocatalytic surface thereon.

In the mounting of silicon anodes in cell bottoms intended for use with graphite anodes, it has been found that cracking and fracturing occur in the silicon below the lead, at the silicon-lead interface and in the silicon above the upper surface of the lead. While these cracks and fractures may not immediately result in failure of the anode, they frequently provide a site for subsequent corrosion and failure.

SUMMARY

It has now surprisingly been found that silicon anodes may be mounted in lead lined cell bottoms by providing molten lead on the cell base in contact with the silicon member, while maintaining the amount of molten lead low enough to avoid excessive thermal stresses within the silicon. This is accomplished by providing the molten lead around the silicon member in an amount less than about 2.0 parts of molten lead by volume per part of silicon by volume immersed in the lead and more particularly by keeping the temperature rise of the silicon member, measured ⅛ inch above the top surface of the lead three minutes after establishing contact between the molten lead and the silicon member, below about 120° Centigrade.

DETAILED DESCRIPTION

Disclosed is a method of mounting a silicon casting in molten lead to provide a tight, electroconductive bond therebetween. This method is particularly useful where the silicon member is intended for use as an anode for the electrolysis of sodium chloride brine. Silicon alloys intended for chlor-alkali cell service should have an electrical conductivity greater than 100 (ohm-centimeters)$^{-1}$, should be castable, and should have resistance to acidic media under anodic conditions. These desirable properties are provided by the presence of a dopant and a transition metal. The dopant is typically phosphorus, arsenic, antimony, bismuth, boron, aluminum, or gallium. The dopant is present in an amount sufficient to provide an electrical conductivity greater than 100 (ohm-centimeters)$^{-1}$. The amount of dopant required is generally on the order of about 0.1 percent to about 2 percent by weight.

Additionally, the silicon member has a transition metal content of from about 5 percent by weight to about 35 percent by weight so as to provide castability and enhance physical strength. The transition metal present in the alloy may be scandium, yttrium, a lanthanide, titanium, zirconium, hafnium, tantalum, chromium, molybdenum, tungsten, manganese, technetium, rhenium, iron, cobalt, nickel, ruthenium, rhodium, palladium, osmium, iridium, platinum, copper, silver, or gold. Most commonly, the transition metal will be iron, cobalt, nickel, chromium, manganese, molybdenum, or tungsten. Generally, the transition metal is present in an amount sufficient to provide an alloy characterized by the presence of a predominant silicon-rich phase, i.e., a phase containing silicon and the transition metal at the solubility limit of the transition metal in the silicon, surrounded by a continuous rivulet-like phase that is rich in the transition metal. By rich in the transition metal is meant a phase containing a silicide of the transition metal and generally having a silicon content of from about 40 to about 60 weight percent of silicon, elemental basis. Typically, the transition metal will be iron and the iron content will be from about 3 to about 25 percent by weight.

Additionally, the silicon member will have a suitable electroconductive, electrocatalytic surface thereon. By an electroconductive, electroacatalytic surface is meant a surface having a chlorine overvoltage of less than 0.250 volt at a current density of 250 Amperes per square foot measured in a chlorinated brine solution containing approximately 250 to 300 grams per liter of sodium chloride, and at a temperature of about 27° Centigrade. The electroconductive surface will generally be provided by a platinum group metal, e.g., ruthenium, rhodium, palladium, osmium, iridium, platinum, and oxide of a platinum group metal such as ruthenium oxide, rhodium oxide, palladium oxide, osmium oxide, iridium oxide, or platinum oxide, and the platinum group metal or oxide thereof may be present with refractory metals or refractory oxides such as titanium dioxide, silicon dioxide, or the like.

According to one method of installing silicon electrodes in electrolytic cells intended for use with graphite electrodes, the silicon electrode, replacing the graphite electrode, is mounted in a lead layer. Typically, the lead layer is from one inch thick to about five inches thick and generally from about two inches thick to about three inches thick. The lead layer provides mechanical support to the anode blade as well as electrical connection between the anode bus bars, e.g., copper rods in the cell bottom, and the anode blades.

The lead rests on the cell base. The cell base may be concrete in which case the cell bottom includes copper anode bus bars resting on and in the concrete with the lead casting on top of the concrete and silicon anodes cast into the lead casting. Atop the lead is the protective mastic coating or film.

Alternatively, the cell base may be a cast iron pan with a copper grid. The lead casting rests on the copper grid with silicon anodes embedded in the lead casting and a protective mastic coating or film on top of the lead.

In the assembly of prior art electrolytic cells having graphite anodes and a lead bottom, the graphite anodes are held in place with a jig or die as the molten lead is quickly poured onto the cell bottom and allowed to solidify. The protective layer of mastic, pitch, tar, or the like is then applied above the lead to avoid contact between the lead and the anolyte liquor.

However, as described previously, when this technique is followed with silicon anodes, the anode blades crack, chip, and spall, resulting in fractures and increased corrosion rates. While not wishing to be bound by this explanation, it is believed that these phenomena are due to thermal shock of the silicon blade and thermal stresses within the blade.

According to this invention, molten lead is provided on the cell base in contact with the silicon member while maintaining the temperature and temperature gradients within the silicon member low enough to avoid excessive thermal stresses and cracking. This is accomplished by providing the molten lead on the cell base in contact with the silicon member in an amount low enough that the temperature rise of the silicon member measured ⅛ inch above the surface of the lead is below 120° Centigrade when measured three minutes after establishing contact between the lead and the silicon. Preferably, the temperature rise of the silicon member, measured two inches above the surface of the lead, three minutes after establishing contact with the lead and the silicon should be less than about 45° Centigrade. The temperature rise in the silicon is a transient phenomenon, that is, the temperature varies with time and position and the temperature may continue to rise for some short period of time after all of the lead is solidified. For example, at ⅛ inch above the surface of the lead, the temperature rise should be maintained less than 120° Centigrade three minutes after contact is established between the lead and the silicon, and less than 100° Centigrade five minutes after contact is established.

In the casting of a lead cell bottom, the lead acts as a heat source and the silicon acts as one of several heat sinks. Thus, according to this invention, there is provided less than 2.0 parts of molten lead by volume per part of silicon by volume in contact with the molten lead. In this way, the sensible heat temperature rise in the silicon is low compared to the sum of the sensible heat cooling and heat of fusion of the lead. This is due to the high ratio of silicon mass within the molten lead to the mass of the molten lead.

According to one method of providing a high ratio of silicon to molten lead, a solid lead layer of the desired thickness, e.g., from about one to about five inches is provided, containing apertures therein corresponding to the portion of the base of the silicon member to be embedded in the lead. The total volume of each aperture is generally from about 1.1 to about 3.0 times greater than the volume of silicon to be immersed in the lead, thereby providing a volume available for the molten lead that is from about 0.1 to about 2.0 times the volume of the silicon immersed in the molten lead. In this way, less than 2.0 parts of molten lead by volume are provided per part of silicon by volume. Preferably, there is sufficient molten lead to provide complete contact of the surface of the base or stub of the silicon anode and at least a film of molten lead. That is, silicon to molten lead contact is provided around substantially the entire periphery of the base or stub of the silicon anode.

According to the above described exemplification of this invention, the base of the silicon member is placed into the aperture and molten lead is poured into the aperture around the base of the silicon member. While this provides a low temperature rise within the silicon, the temperature rise can be reduced still further by allowing the molten lead to cool at about the same rate as molten lead is poured into the aperture.

According to the above-described exemplification of this invention, a die is made having plugs corresponding to the locations of the bases of the silicon anodes. This die is placed on the cell bottom and molten lead is then poured onto the cell bottom at a normal rate and to a normal level. After the lead has cooled and solidified, the die and plugs are removed, thereby providing a lead cell bottom having apertures corresponding to the bases of the silicon members to be embedded in the lead. The bases of the silicon blades are then placed into the apertures in the lead and molten lead is poured into the apertures around the bases of the silicon blades. In this way, less than 2.0 parts of molten lead by volume are provided per part of silicon by volume.

According to another exemplification of this invention, a layer of molten lead is slowly built up on the cell bottom around the bases of the silicon members while the silicon members are held in place, e.g., by a suitable jig. According to this exemplification of our invention, the layer of lead is built up at a rate of from about one-half inch per minute to about two inches per minute by slowly pouring the lead onto the cell base. Typically, when mounting silicon electrodes, the lead is poured onto the base at a rate of from three-quarters inch per minute to about two inches per minute and preferably from about three-quarters inch per minute to about one inch per minute, to avoid laminating or layering of the lead.

Additionally, the silicon blade may be rendered more receptive to mounting in lead by the presence of a material adherent to the silicon and wettable by lead on the silicon anode at the base thereof. For example, nickel, copper, tin, aluminum, zinc, silver, palladium, platinum, or gold may be deposited on the base of the silicon member prior to mounting the silicon member in the lead. Typically, nickel, copper, or tin is electroplated onto the base of the silicon in order to provide a more electroconductive bond between the lead and the silicon.

While the invention has been described with reference to maintaining only a limited amount of molten lead in contact with the silicon, it is to be understood that a low temperature rise with time within the silicon may be provided in other ways. For example, the temperature of the silicon may be slowly raised to near the temperature of molten lead, and maintained thereat while pouring and casting the lead. In this way, while the silicon is maintained at an elevated temperature, i.e., above about 200° Centigrade, and preferably above about 280° Centigrade or even above about 300° Centigrade, the rate of temperature rise of the silicon member is maintained at low level, e.g., below about 120 Centigrade °, ⅛ inch above the surface of the lead, three minutes after pouring, when an entire two or three-inch layer of lead is cast in about 20 seconds. The silicon may be maintained at an elevated temperature by heating the silicon prior to casting the lead, for example, with a gas fired furnace.

The method of this invention may be more clearly understood by reference to the following example.

EXAMPLE 112 silicon anodes were inserted in apertures in the lead base of a monopolar electrolytic cell and molten lead was added to the apertures. Completely satisfactory bonds were obtained between the lead and each of the anodes.

112 ferro-silicon anodes were prepared from a ferro-silicon alloy containing approximately 8 percent iron and approximately 0.4 weight percent boron. The portion of the anode base that was to be inserted in lead was flint blasted, cleaned with acetone, and then etched in a solution containing one part hydrofluoric acid, two parts nitric acid, and seven parts water by volume, at 25° Centigrade for four minutes. Thereafter, the etched anode bases were copper plated from a bath containing 213 grams per liter of copper sulfate and 52.5 grams per liter of sulfuric acid at 25° Centigrade. The copper plating was conducted at a current density of 20 Amperes per square foot for 30 minutes to provide a heavy, adherent deposit approximately 0.01 inch thick. After copper plating, the anode bases were rinsed in water, rinsed in acetone, dried, and heated to 150° Centigrade for 120 minutes to remove any water which may have been absorbed in the pores of the ferro-silicon during the etching or copper plating steps.

A wooden die was prepared containing 112 positive molds. Each positive mold measured 1¾ inches by 5 inches at the bottom with a 0.5 inch radius and tapered to 2¼ inches by 5¼ inches at a distance 3 inches above the bottom. The wooden molds were then coated with a graphite release agent and placed in an iron mold into which the molten lead was to be poured, and secured in place with a standard jig assembly.

Molten lead at 450° Centigrade was poured into the iron mold to a depth of two inches around the wooden molds. After the lead had solidified and cooled to about 100° Centigrade the wooden jigs were removed and a lead slab with 112 apertures was lifted from the iron mold and placed in a concrete cell bottom.

The individual anodes, each having base cross section measuring 1¼ inches by 3¾ inches, were then placed in the apertures of the lead cell bottom. Molten lead was then separately ladled into each aperture and the cell bottom covered with tar and pitch.

No defects, cracks, or fractures of the silicon were observed.

While the invention has been described with specific reference to specific details of particular embodiments and exemplifications thereof, it is not to be so limited as changes and alterations therein may be made which are within the full intended scope of this invention as defined by the appended claims.

We claim:

1. A method of mounting a solid silicon member in a lead member mounted on a cell base, said silicon member extending outwardly from and supported by said lead member, comprising:
   providing a solid lead layer having an aperture corresponding to and complimentary to a base of said silicon member;
   placing the base of the silicon member in said aperture;
   adding molten lead to the aperture to provide molten lead around the base of the silicon member in an amount less than 2.0 parts of molten lead by volume per part of silicon immersed in the lead by volume; and
   allowing said molten lead to cool and solidify.

2. The method of claim 1 wherein the volume of the aperture is from about 1.1 to about 3.0 times the volume of the silicon member.

3. A method of mounting a solid silicon member, intended for use as an anode, in a lead base mounted on a cell base, comprising:
   providing a layer of solid lead on the cell base, said layer having an aperture corresponding to and complimentary to a base of the silicon member;
   placing the silicon member in the aperture; and
   adding molten lead to the aperture to provide molten lead in contact with the base of said solid silicon member while maintaining the temperature rise of the silicon member, measured ⅛ inch above the top surface of the lead three minutes after establishing contact between the molten lead and the silicon member below about 120° Centigrade.

4. The method of claim 3 wherein the volume of the aperture is from about 1.1 to about 3.0 times the volume of the base of the silicon member.

5. A method of mounting a solid silicon member, intended for use as an anode, in a lead base mounted on an electrolytic cell base, comprising:

establishing a layer of solid lead on the cell base, said layer having an aperture corresponding to and complimentary to the base of the silicon member;

placing a base of a silicon member in the aperture; and adding molten lead to the aperture to provide molten lead in contact with the base of said solid silicon member while maintaining the temperature rise of the silicon member measured two inches above the top surface of the lead three minutes after establishing contact between the molten lead and the silicon member below about 45° Centigrade;

allowing the lead to solidify; and coating the solidified lead with asphaltic mastic.

6. The method of claim 5 wherein the volume of the aperture is from about 1.1 to about 3.0 times the volume of the base of the silicon member.

7. The method of claim 5 wherein the molten lead is poured onto the cell base at a rate less than two inches per minute.

8. The method of claim 5 wherein the silicon member is maintained at an elevated temperature while establishing contact between the silicon member and the molten lead.

9. The method of claim 5 wherein the silicon member is maintained above about 200° Centigrade.

* * * * *